3,478,884
COMBINED WATER DISTRIBUTION AND REGENERATION SYSTEM

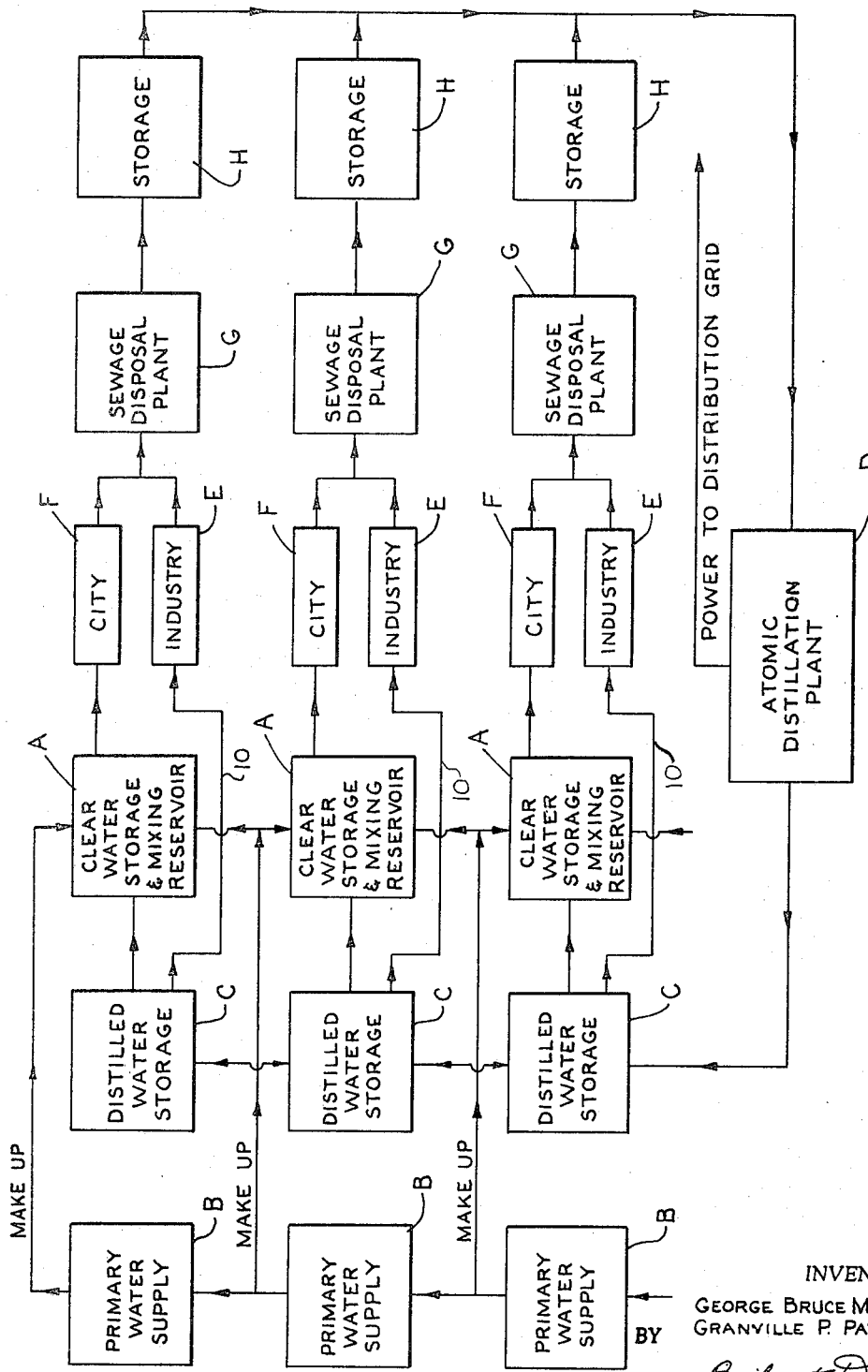

George Bruce McPherson, 408 S. Main St., and Granville P. Patterson, Calhoun Towers, both of Greenville, S.C. 29601
Filed Mar. 8, 1968, Ser. No. 711,553
Int. Cl. C02c 3/00
U.S. Cl. 210—152            2 Claims

ABSTRACT OF THE DISCLOSURE

A combined water distribution and regeneration system for a metropolitan area wherein, a distillation plant is provided for supplying distilled water to a plurality of distilled water storage reservoirs which, in turn, feed the water to a clear water storage reservoir which also receives make-up water from a natural supply. Water from the distilled water storage reservoir is supplied to selected consumers within the metropolitan area, while other consumers within the area are supplied with water from the mix water reservoir. Each of the metropolitan areas has a sewage disposal plant which receives water from the consumers after such has been used for removing solids therefrom. The water from the sewage disposal plant is then fed back to the distillation plant via a storage reservoir to be distilled and reinserted within the water distribution system. The distillation plant also generates electricity during the distilling process for use in the metropolitan areas.

---

This invention relates to a water conservation and distribution system, and more particularly to a water system for a plurality of metropolitan areas.

In the United States at the present time there are many metropolitan areas where the demand for water frequently becomes greater than the supply and, as a result new industry and the like is hesitant to come into such areas. Frequently, these areas have an abundance of water nearby, however, such is often contaminated and not fit for industrial or human consumption.

It is well-known that salt water or waste water from municipal areas can be rejuvenated into pure distilled water through evaporation and condensation. Normally, the cost of such is prohibitive and as a result, such has not been widely used.

It has been found, however, that by using an endless cycle water system which includes a distillation plant, such as an atomic distillation plant which generates electricity and distilled water, such can make the system economically feasible since domestic waste water is conserved for reuse, stream pollution is minimized, and at the same time saleable electric power is produced.

Accordingly, it is an important object of the invention to provide a combined water distribution and regenerating system which conserves water, minimizes water pollution, and produces pure water for selective consumer use.

Another important object of the present invention is to provide a combined water distribution and regenerating system wherein a combined water distillation and power generating system is strategically located with regard to a plurality of metropolitan areas for supplying distilled water to the individual metropolitan areas or water districts, and for receiving contaminated water therefrom so that such can be purified and reinserted within the individual water systems.

Another important object of the present invention is to provide a water and power system for a plurality of areas which is economical and sanitary.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

The figure is a block diagram illustrating a combined water distribution and regenerating system constructed in accordance with the present invention.

The drawing illustrates a combined water distribution and regenerating system for a plurality of areas, each of which has a water storage and mixing reservoir A. Natural water is supplied from a primary water supply B, such as a lake or stream, to the mixing reservoir to aid in maintaining such filled. Distilled water is also supplied to the mixing reservoir from a distilled water storage reservoir C to be mixed with the natural water from the primary water supply B. A distillation and electricity generating plant D is provided for supplying distilled water to the distilled water storage reservoir C associated with a particular water subsystem. Part of the distilled water from the distilled water storage reservoir C is supplied to selective consumers E, such as indicated by the designation industry, while the remaining consumers within the metropolitan area, which are generally designated as city and the reference character F, receive their water from the clear water storage and mixing reservoir A. The used water from both of these consumers is supplied to a sewage disposal plant G for removing solids and the like therefrom. The water from the sewage disposal plant is fed back to the atomic distillation plant D via storage reservoirs H and used as a coolant in the atomic distillation and electricity generating plant D.

Thus, it can be seen that by strategically locating an atomic distillation plant relative to a plurality of water districts or metropolitan areas water can be conserved, since only make-up water has to be added from the primary water supply B to compensate for water lost, as a result of such being used for purposes other than that which would normally be returned through the sewage system. Not only does the system provide an economic method of producing electricity, while simultaneously conserving water, it minimizes contamination of streams and the like, which so often is the situation around large metropolitan areas.

From the estimates given by the United States Bureau of Census the population of the Continental United States through natural growth in the year 1985 will be 32% greater than it was in 1965, and in the year 2015, 110% greater. The growth in industry, which will increase with it, will put a great strain on natural water resources as presently used, and all possible conservation methods must be utilized. The growth will also increase the demand for electric power. The system constructed in accordance with the present invention uses the heat developed by an atomic reactor in generating electricity to distilled water which is reinserted back into the water cycle. This is accomplished by allowing the reactor coolant, which is to be maintained at a selected temperature, to pass through a heat exchanger for the reactor in which steam is produced to drive a turbo-generator which develops electric power. Steam, at a selected temperature, is extracted from the turbine and is condensed in another heat exchanger that heats the waste to a temperature well above its boiling point.

The super heated waste water then passes through a series of vacuum chambers where it flashes into steam and condenses on cold surfaces provided for this purpose. The distilled water, in turn, drops into collecting pans.

Atomic distillation plants capable of being used in the system are known, and one is presently under construction on Bolsa Island near Los Angeles, Calif. Other types of distillation plants, such as gas, could be used wherein the steam produced by the gas heated water is used to drive the turbines for generating electricity and the condensation reinserted into the water system.

The clear water storage and mixing reservoir may be in the form of a large lake wherein distilled water from the reservoir C can be supplied thereto. Make-up water from any natural water supply, such as spring fed lakes, streams or the like, is also supplied to the water storage and mixing reservoir A in order to maintain such filled. By recirculating the water in the system through the atomic distillation plant D it can be seen that the make-up water is substantially less than the water normally used. Any of the reservoirs may be natural or man made lakes, or in some instances the distilled water storage supply may be in the form of tanks.

The water from the distilled water storage reservoir C may be piped through pipes 10 to industry within the immediate area. By using distilled water in industry such minimizes corrosion and deterioration of the machinery used therein. The distilled water also simplifies the operation of many plants, such as bleacheries, wherein chemicals are added thereto for finishing cloth and the like. Since the chemical content of the water coming into the plant is constant, it is easier to control the amount of additives to be placed therein to obtain a desired chemical composition.

As previously mentioned, water from the mixing reservoir A is also supplied to consumer within the metropolitan area or city. Normally, the chemical composition of such water is not critical or important.

The waste from the city F and industrial areas E is fed into a conventional sewage disposal plant G for removing solids and the like therefrom. Solids removed at the sewage disposal plant G may be treated and subsequently reused for fertilizer and the like. It is important that the suspended and dissolved solids in the waste water be removed by the conventional sewage disposal plant prior to feeding such back to the distillation plant D in order to prevent scaling in the water heaters within the distillation plant D.

Storage reservoirs H in the form of ponds or lakes are provided for receiving water from the sewage disposal plants G so as to maintain a ready supply of water for the distillation plant D.

The distilled water in the storage reservoir C should be equipped with conventional apparatus to aerate and "polish" the water in order that it regain its normal oxygen content and have odors that may have been picked up in the distillation process removed therefrom.

As can be seen from the drawing, a single atomic distillation plant can be used to supply distilled water to a plurality of water systems. The power generated from such plant is also supplied to the same metropolitan areas. Normally, the atomic distillation plant D is located adjacent the sewage disposal plants B in a remote area away from the metropolitan areas.

While a preferred embodiment of the invention has been described using specific terms, such description is for illustrative purposes only, and it is to be understood that changes and variations may be made without departing from the spirit or scope of the following claims.

What is claimed is:

1. A combined water distribution and regeneration system for a metropolitan area comprising: a water storage and mixing reservoir; means for supplying natural water to said mixing reservoir; a distilled water storage reservoir; a distillation plant provided for supplying distilled water to said distilled water storage reservoir; means for supplying water from said distilled water storage reservoir to said mixing reservoir to be mixed with said natural water; means for supplying distilled water from said distilled water storage reservoir to selected consumers within said metropolitan area; means for supplying water from said mixing reservoir to other consumers within said metropolitan area; a sewage disposal plant provided for receiving water from said consumers after such has been used for removing solids therefrom; and means for supplying water from said sewage disposal plant to said distillation plant to be distilled and reinserted into said water distribution system.

2. The combined water distribution and regeneration system as set forth in claim 1, wherein said distillation plant is strategically located relative to a plurality of metropolitan areas; each of said metropolitan areas having a distilled water storage reservoir, a natural water reservoir and a sewage disposal plant coupled together for serving consumers in said areas, and said distillation plant supplying distilled water to said distilled water reservoirs in a respective area while receiving water from said respective sewage disposal plant.

References Cited
UNITED STATES PATENTS

| | | | |
|---|---|---|---|
| 1,091,919 | 3/1914 | Faget | 210—157 |
| 2,094,909 | 10/1937 | Bailey et al. | 210—152 X |
| 2,246,224 | 6/1941 | Streanner | 210—152 |
| 3,242,058 | 3/1966 | Ganley et al. | 210—152 X |
| 3,410,796 | 11/1968 | Hull | 203—10 X |

REUBEN FRIEDMAN, Primary Examiner

J. W. ADES, Assistant Examiner

U.S. Cl. X.R.

210—167, 170